(12) United States Patent
Wilson (10) Patent No.: US 11,861,968 B2
(45) Date of Patent: Jan. 2, 2024

(54) BATTERY STORAGE AND DISPENSING APPARATUS

(71) Applicant: Stephen James Wilson, San Francisco, CA (US)

(72) Inventor: Stephen James Wilson, San Francisco, CA (US)

(*) Notice: Subject to any disclaimer, the term of this patent is extended or adjusted under 35 U.S.C. 154(b) by 0 days.

(21) Appl. No.: 17/510,210

(22) Filed: Oct. 25, 2021

(65) Prior Publication Data

US 2022/0292908 A1 Sep. 15, 2022

Related U.S. Application Data

(63) Continuation of application No. 16/267,890, filed on Feb. 5, 2019, now Pat. No. 11,158,150.

(60) Provisional application No. 62/639,510, filed on Mar. 7, 2018.

(51) Int. Cl.
*G07F 11/02* (2006.01)
*H01M 50/20* (2021.01)
*H01M 50/204* (2021.01)

(52) U.S. Cl.
CPC ........... *G07F 11/02* (2013.01); *H01M 50/204* (2021.01); *H01M 2220/30* (2013.01)

(58) Field of Classification Search
CPC ........... A47F 1/08; A47F 1/125; B65D 5/726; B65D 2577/041; B65D 2577/043; B65D 2585/88; G07F 11/02; G07F 11/04; H01M 2/1022; H01M 2220/30
See application file for complete search history.

(56) References Cited

U.S. PATENT DOCUMENTS

| 1,678,094 | A | * | 7/1928 | Ziemmerman | ........... A47F 1/08 |
| | | | | | 221/268 |
| 1,694,897 | A | | 12/1928 | Washburn | |
| 1,753,957 | A | | 4/1930 | Washburn | |
| 1,973,867 | A | * | 9/1934 | Cook | ........... A47F 1/10 |
| | | | | | 221/281 |
| 2,119,700 | A | | 6/1938 | Burgess | |
| 3,184,104 | A | | 5/1965 | De Domenico | |
| 3,194,620 | A | | 7/1965 | Sauer | |
| 3,221,930 | A | * | 12/1965 | Nasgowitz | ........... H01M 50/213 |
| | | | | | 221/92 |
| 3,395,809 | A | | 8/1968 | Mellion | |
| 3,404,927 | A | | 10/1968 | Mellion | |
| 3,486,658 | A | * | 12/1969 | Cheslak | ........... G07F 11/04 |
| | | | | | 221/197 |
| 4,109,980 | A | * | 8/1978 | Brockman | ........... A47F 1/08 |
| | | | | | D6/571 |
| 4,497,432 | A | | 2/1985 | Milia | |
| 4,530,548 | A | | 7/1985 | Spamer | |

(Continued)

FOREIGN PATENT DOCUMENTS

GB 2071618 A 9/1981
GB 2422820 A 9/2006

(Continued)

*Primary Examiner* — Gene O Crawford
*Assistant Examiner* — Kelvin L Randall, Jr.
(74) *Attorney, Agent, or Firm* — MT HUNT LAW; Marcus T. Hunt (57) ABSTRACT

A boxed battery dispenser configured to hold a plurality of battery trays. Each battery tray of the plurality of battery trays is configured to hold a plurality of batteries, and each battery tray can be independently removeable from the dispenser.

14 Claims, 9 Drawing Sheets

(56) References Cited

U.S. PATENT DOCUMENTS

| | | | | |
|---|---|---|---|---|
| 4,767,022 A | * | 8/1988 | Oldorf | G07F 11/18 221/92 |
| 4,872,591 A | * | 10/1989 | Konopka | A61J 7/0481 221/129 |
| 5,143,252 A | * | 9/1992 | Shi | A47F 1/08 224/908 |
| 5,148,944 A | | 9/1992 | Kaufman | |
| 5,193,717 A | | 3/1993 | Rink | |
| 5,335,816 A | | 8/1994 | Kaufman | |
| 5,555,965 A | | 9/1996 | Mishina | |
| 5,670,268 A | | 9/1997 | Mancusi | |
| 5,700,075 A | | 12/1997 | Perone | |
| 5,833,118 A | | 11/1998 | Weiss | |
| 5,855,422 A | | 1/1999 | Naef | |
| 6,227,386 B1 | | 5/2001 | Close | |
| 6,247,611 B1 | | 6/2001 | Clements | |
| D477,531 S | * | 7/2003 | Wilczewski | D9/733 |
| RE38,368 E | * | 12/2003 | Bishop | B65D 85/04 221/212 |
| D624,832 S | | 10/2010 | Wendelberger | |
| 7,900,797 B1 | * | 3/2011 | Witcraft | G07F 11/04 221/187 |
| 8,228,024 B1 | | 7/2012 | Zander | |
| 9,159,967 B1 | | 10/2015 | Hanson et al. | |
| 11,026,525 B2 | * | 6/2021 | Barzee | A47F 5/0853 |
| 2003/0120380 A1 | * | 6/2003 | Bean | G07F 7/06 700/238 |
| 2004/0035746 A1 | | 2/2004 | Lee et al. | |
| 2005/0218153 A1 | * | 10/2005 | Dejeu | A47F 1/08 221/251 |
| 2006/0182656 A1 | * | 8/2006 | Funke | G01N 33/48757 422/400 |
| 2007/0170087 A1 | | 7/2007 | Narpes, Jr. et al. | |
| 2009/0272756 A1 | | 11/2009 | Hackney | |
| 2016/0185509 A1 | | 6/2016 | Bittinger | |
| 2018/0215501 A1 | * | 8/2018 | Begim | B65D 85/68 |
| 2018/0351378 A1 | * | 12/2018 | Eisenbruk | H02J 7/0042 |

FOREIGN PATENT DOCUMENTS

| WO | 9513001 A1 | 5/1995 |
|---|---|---|
| WO | 0030189 A1 | 5/2000 |

* cited by examiner

BATTERY STORAGE AND DISPENSING APPARATUS

CROSS-REFERENCE TO RELATED APPLICATIONS

This application is a continuation of U.S. patent application Ser. No. 16/267,890, filed on Feb. 5, 2019, which claims benefit of U.S. Provisional Application No. 62/639,510, filed Mar. 7, 2018, and the entireties of the aforementioned applications are incorporated herein by reference.

FIELD OF THE INVENTION

The subject matter of the present disclosure relates generally to the field of dispensing devices, and particularly, the present disclosure relates to dispensing devices for consumer batteries.

BACKGROUND

Batteries are commonly used in many households to power consumer goods, such as toys, electronic devices, flashlights, headphones, remote controls, etc. Some professions, such as those in the entertainment and travel industries, as well as law enforcement, use batteries to power remote communication devices which are always on over the course of a workday. Hence, for many households and professions, battery demand can be quite high.

Improper storage of batteries can cause batteries to prematurely discharge or even physically degrade. Batteries often are sold in disposable packaging that is not intended to provide any type of long-term storage. Simply opening a large battery pack can present the immediate issue of having to store dozens of loose batteries when only one or two were required for immediate use. Complicating this is that majority of consumer-style batteries sold today are cylindrical, which tend roll in random directions when placed on surfaces. In view of the foregoing, it would desirable to address battery storage and dispensing issues that exist for many households and workplaces.

SUMMARY OF THE INVENTION

Some embodiments of the invention related to apparatuses that conveniently store stacks of batteries, allow batteries to be conveniently refilled/stocked, and allow for batteries to be easily and conveniently dispensed.

Some embodiments relate to a battery dispenser for dispensing of one or more types of batteries, which can include AAA, AA, C, D, and 9-volt batteries for example. The battery dispenser can be wall mounted and hold battery trays that in turn each hold a stack of batteries. Batteries are dispensed from the trays from a bottom location of the dispenser. The trays can be removeable from the dispenser to enable a user to reload or replace empty trays. The trays can be removed without disturbing placement or function of the remaining trays that remain in the dispenser. Ejection mechanisms can be used that operate to eject all or a portion of a battery from the trays.

Some embodiments relate to battery dispenser. The battery dispenser can have a wall panel. A bottom panel can be affixed to the wall panel. A first side panel and second side panel can be included, and each can be affixed to the wall panel and the bottom panel. A face panel can be affixed to at least the first and second side panels. A plurality of interior dividing features can be located between the wall panel and the face panel. The plurality of interior dividing features can define a plurality of battery tray channels. A plurality of battery trays can be included. Each battery tray of the plurality of battery trays can be configured to hold a plurality of batteries, and each battery tray can be independently removeable from one one of the battery tray channels of the plurality of battery tray channels.

In some embodiments, the face panel, first and second side panels, and wall panel can at least partially define a battery tray loading opening at an upper portion of the battery dispenser, and each battery tray loading opening of the plurality of battery tray loading openings can correspond to one of the battery tray channels of the plurality of battery tray channels.

In some embodiments, the bottom panel, first and second side panels, and wall panel can at least partially define a plurality of battery tray ejection openings at a bottom portion of the battery dispenser, and each battery tray ejection opening of the plurality of battery tray ejection openings can correspond to one of the battery tray channels of the plurality of battery tray channels.

In some embodiments, each battery tray of the plurality of battery trays can be configured to be slideably insertable into and removable out of one of the battery tray loading openings of the plurality of battery tray loading openings without disturbing any remaining battery trays of the plurality of battery trays housed within the plurality of battery tray channels.

In some embodiments, each battery tray opening of the plurality of battery tray openings can be formed within the face panel.

In some embodiments, a plurality of battery ejection mechanisms can be housed at the bottom panel.

In some embodiments, each battery tray can be configured to cooperate with a battery ejection mechanism of the plurality of battery ejection mechanisms to eject batteries from the cooperating battery tray.

In some embodiments, each battery tray ejection mechanism of the plurality of battery tray ejection mechanisms can include a pull tab configured to at least partially eject a lower-most battery stacked in a battery tray of the plurality of battery trays.

In some embodiments, the plurality of interior dividing features can include a plurality of interior panels.

In some embodiments, the plurality of interior panels can be affixed to the wall panel and the face panel.

BRIEF DESCRIPTION OF THE DRAWINGS

For a better understanding of at least certain embodiments, reference will be made to the following Detailed Description, which is to be read in conjunction with the accompanying drawings, wherein.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles of the invention described herein.

DETAILED DESCRIPTION

Before the present invention is described in greater detail, it is to be understood that this invention is not limited to the embodiments described, as such can, of course, vary. It is also to be understood that the terminology used herein is for the purpose of describing particular embodiments only and is not intended to be limiting, because the scope of the present invention will be limited only by the appended claims.

Figure 1A:
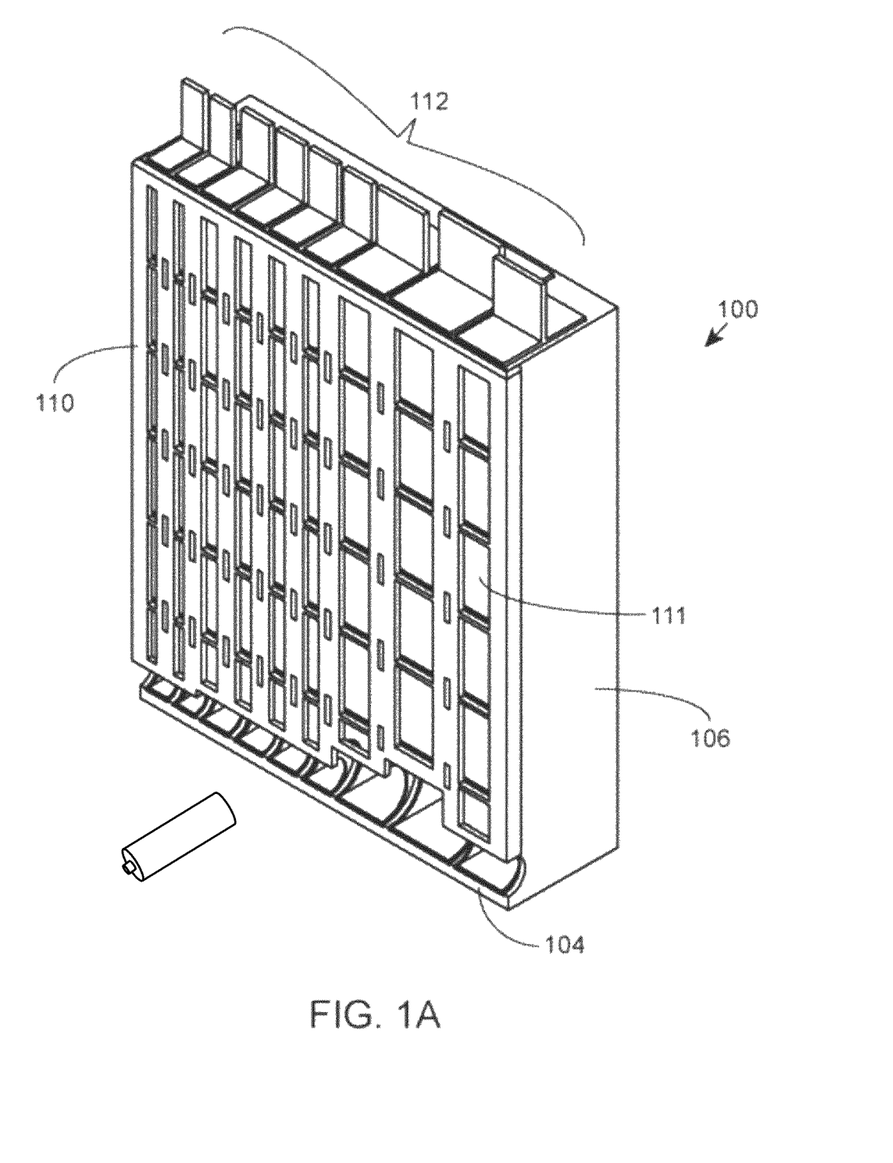
FIGS. 1A-1C depict perspective views of an apparatus for storing and dispensing batteries, according to some embodiments.
Figure 1B:
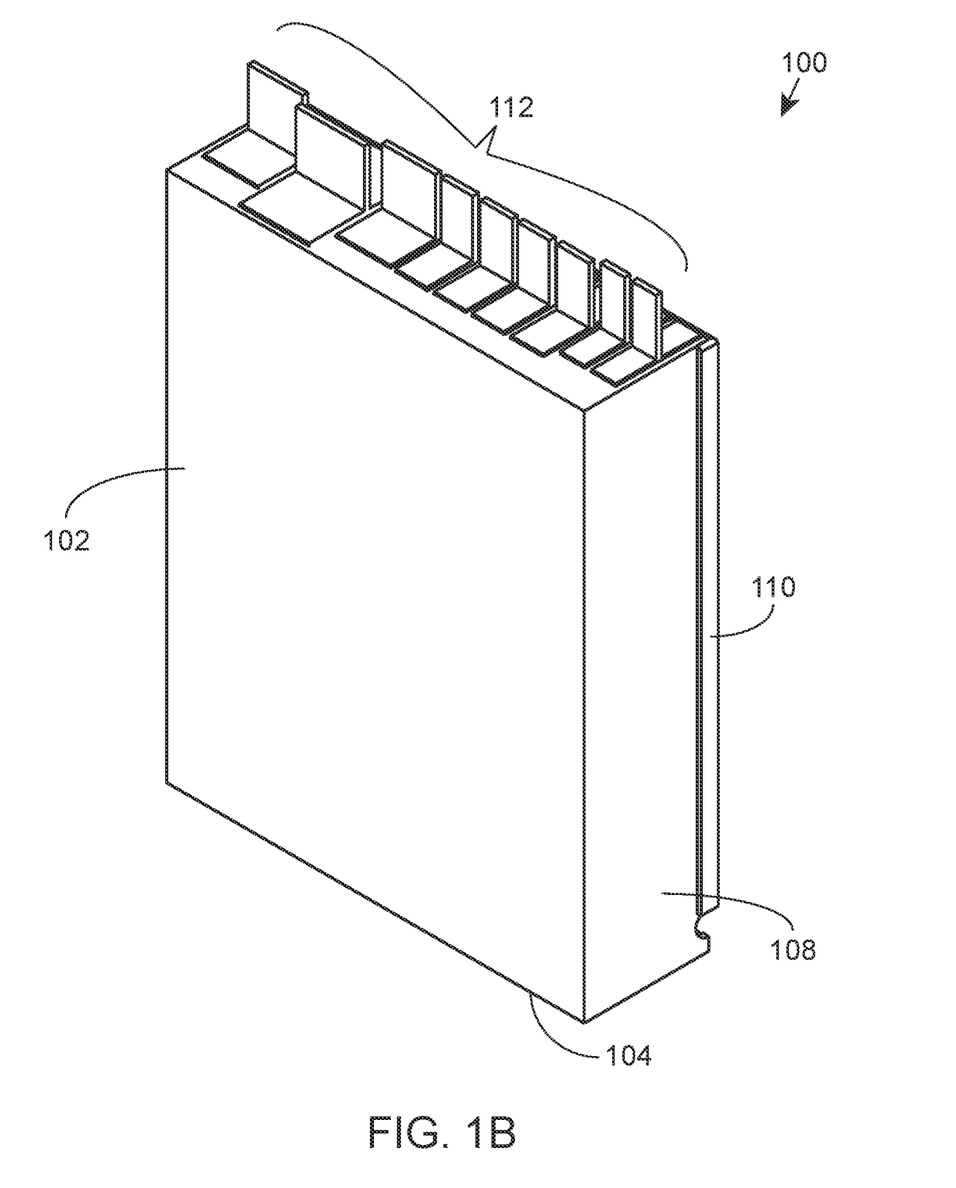

FIGS. 1A and 1B respectively show front and back perspective views of an example of a battery dispenser 100, which generally can have a box-like structure defined by interconnected panels. The battery dispenser 100 can be configured to dispense batteries at a bottom location.

The battery dispenser 100 includes a wall panel 102 configured to mount against a vertical wall. The wall panel 102 can include holes for enabling attachment by fasteners to a wall. A bottom panel 104 is connected to the wall panel 102 at the bottom of the battery dispenser 100. A first side panel 106 and a second side panel 108 connect to the wall panel 102 and the bottom panel 104 at lateral ends of the battery dispenser 100. A face panel 110 attaches to at least the first side panel 106 and the second side panel 108. As shown, the face panel 110 can include openings 111 for visually checking presence of batteries, however, in some embodiments the openings are omitted. Batteries are dispensed from the battery dispenser 100 at one or more openings (defined by at least the bottom panel 104, first side panel 106, second side panel 108, and the face panel 110) formed at the bottom portion of the battery dispenser.

Figure 1C:
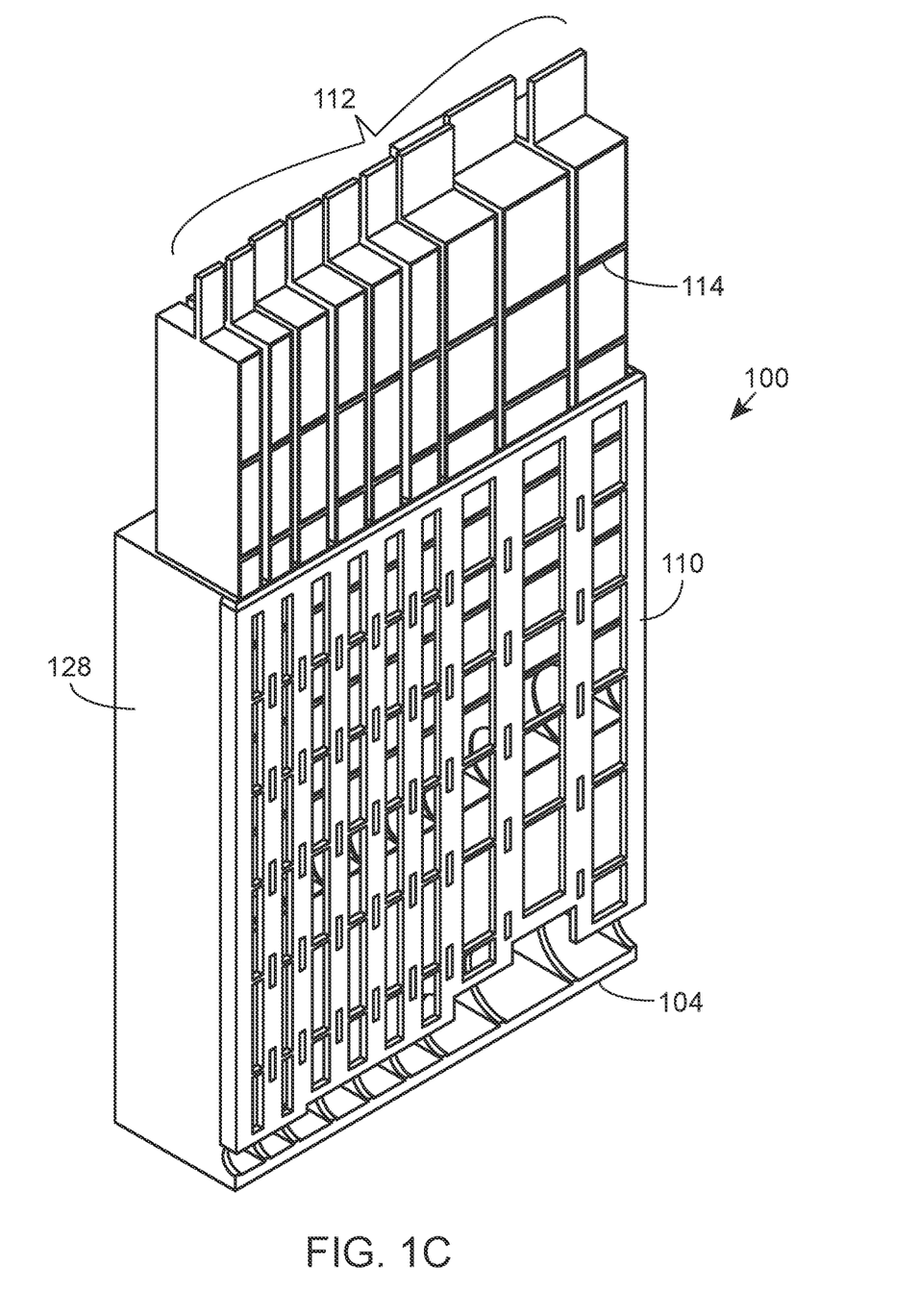

A plurality of reloadable battery trays 112 can be independently inserted into and removed from the top of the dispenser, which is illustrated in FIG. 1C showing a partial insertion of the battery trays 112. The battery trays 112 are inserted into one or more openings formed between at least the top portion of the wall panel 102, face panel 110, first side panel 106, and the second side panel 108.

The battery trays 112 have a boxed structure and are elongated to hold a plurality of vertically stacked batteries. The battery trays 112 are enclosed on at least five sides and in some embodiments are open facing the face panel 110. Batteries can be inserted into the opening when the trays are removed. The battery trays 112 can include one more cross members 114 to help stiffen the trays. In some embodiments, for disposable/recyclable battery trays that come preloaded with batteries, the battery trays 112 are fully enclosed except for a consumer removable dispensing opening. As shown, the battery trays 112 can include pull tabs, each extending from the top most portion of each tray. In some embodiments, the pull tabs are configured as loops and/or can fold flat. In other embodiments, the pull tabs are omitted from the battery trays 112.

In the example shown, each battery tray 112 is configured to hold a certain type of battery (e.g., AA, AAA, AAAA, PP3, C, & D type batteries) and therefore trays of varying sizes are shown. However, in some embodiments the battery dispenser 100 is configured for holding multiple battery trays 112 configured for only one size of battery.

The battery trays 112 can be configured to stack batteries such that each battery is substantially transverse to the wall panel 102, i.e., such that the longest central axis of each battery is perpendicular to back planar surface of the wall panel 102. This arrangement prevents cylindrical batteries from accidentally self-ejecting from the battery dispenser 100. Alternatively, the battery trays 112 can be configured to stack batteries such that each battery is substantially parallel to the wall panel 102, i.e., such that the longest central axis of the battery is parallel to back planar surface of the wall panel 102. In such embodiments, the battery trays 112 can include a physical stop (e.g., lip) to prevent the batteries from ejecting due to gravity or be configured to bias the bottom-most battery of a stack of batteries towards the wall panel 102 instead of the face panel 110.

Figure 1D:
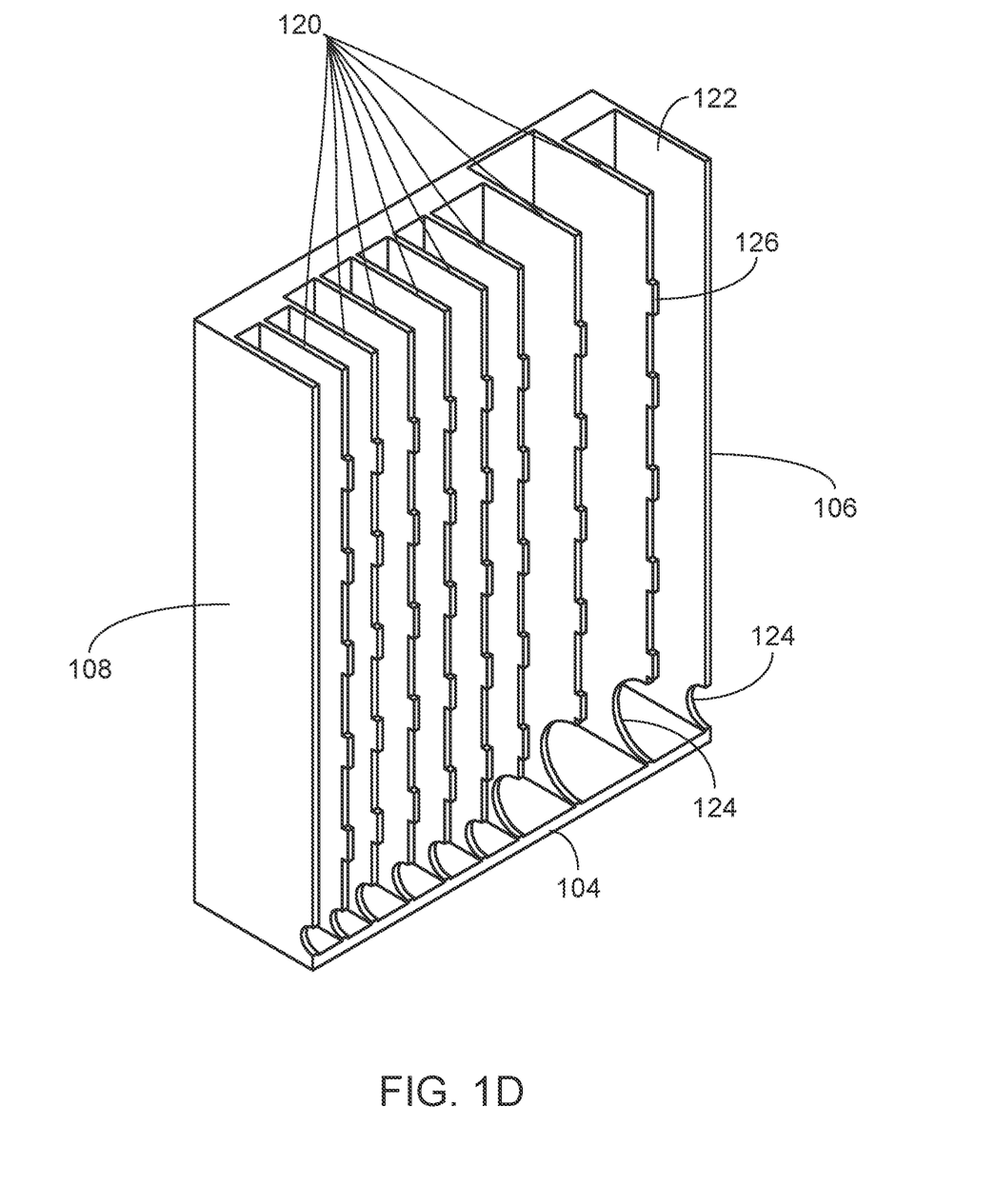
FIG. 1D depicts a perspective view of an aspect of the apparatus of FIGS. 1A-1C.

FIG. 1D shows a partial construction of the battery dispenser 100 to illustrate the interior a plurality of interior dividing features 120. In this example, the interior dividing features 120 are configured as dividing panels connected to the bottom panel 104 and wall panel 102 while being parallel to and between the first side panel 106 and second side panel 108. The interior dividing features 120 and first and second side panels 104/106 together at least partially define a plurality of battery tray channels 122 between the face panel 110 and the wall panel 102. Each battery tray channel 122 is configured hold one of the battery tray trays 112. Accordingly, each interior dividing feature 120 is spaced apart from one another such that a battery tray 112 can slide within a corresponding battery tray channel 122.

Each interior dividing feature 120 and first and second side panels 104/106 can include cut-outs 124 to enable partial insertion of fingers into the battery tray channels 122 for removal of batteries. Each interior dividing feature 120 can also include engagement features 126 for enabling mechanical attachment with the face panel 110. Here, the engagement features 126 are configured as male protrusions for fitting within like-shaped female openings of the face panel 110. In some embodiments, some or all of the interior dividing features 120 are not configured as panels, but instead features such as ribs or channels can extend from or into the wall panel 102 and/or face panel 110 to provide guides for the battery trays 112.

The panels and battery trays of the battery dispenser can be constructed from a variety of materials, such as polymers, metals, composite materials, and wood materials (e.g., plywood, fiberboard). In some embodiments, one or more of the panels are made integral by way of the construction technique implemented, e.g., by 3-D printing, extrusions, or molding. Generally, it is desirable to provide a relatively stiff structure for the battery dispenser that is resistant to flexure from weight of the batteries, which can be significant and non-evenly distributed, e.g., when only one side of the battery dispenser is loaded. Hence, the battery dispenser should be designed to account for such loading. In some embodiments, to promote stiffness each panel can be configured to be permanently affixed into the greater structure of the battery dispenser. Notably, because the battery trays are inserted through discrete openings, stiffness of the exemplary battery dispenser 100 is not compromised by openable panels. In some embodiments, the battery trays are purchased pre-loaded with batteries and configured for one-time use. In such embodiments, the battery tray can be constructed from a disposable/recyclable paper or polymer material.

In use, the battery dispenser is mounted to a wall or other structure in a manner such that the wall panel 102 is made substantially vertical and the bottom panel 104 is orientated closest to the floor. The battery dispenser 100 should be mounted at a height that allows relatively easy access (without physical discomfort) to the bottom of the battery dispenser 100 for retrieval of batteries and to the top of the battery dispenser 100 for loading battery trays. Batteries can then be loaded into the battery trays or are provided pre-loaded.

The loaded battery trays are then inserted into the upper openings (defined by at least the wall panel 102, first side panel 106, second side panel 108, and the face panel 110) such that each battery tray 112 is slidingly received by a corresponding battery tray channel 122. As a result, each loaded battery tray channel contains a stack of batteries for dispensing. This manner of loading the battery dispenser 100 with batteries via the battery trays 112 is advantageous because it does not require insertion of one battery at a time into the dispenser (which can result in binding of the batteries due to the batteries falling a full vertical travel distance of the dispenser and also cause arm/shoulder fatigue when repeatedly loading numerous batteries) or require removal of the face panel 110 (which can cause the dispenser to flex due to battery loads present in the dispenser and make replacement of the face panel difficult or cause loaded batteries to fall out).

Batteries can then be physically retrieved by accessing (e.g., using fingers) the dispensing openings that are defined by at least the bottom panel 104, first side panel 106, second side panel 108, and the face panel 110. Removal of one battery of a stack of batteries causes any remaining batteries of that stack to slide downward, in a uniform manner without binding, hence a second battery stacked directly on top of the removed battery is then made accessible for dispensing.

When a battery tray is empty or when it is desired to refill a partially loaded battery tray 112, the battery tray 112 can be removed by accessing it at the top of the battery dispenser 100 and applying a vertical force to slide the battery tray 112 out of a corresponding tray channel 122. The battery tray 112 can be grasped at a corresponding pull tab if present. The removed battery tray 112 can then be placed on a horizontal surface, reloaded with batteries, and then reinserted into the battery dispenser 100. This arrangement is advantageous because each battery tray 112 can be independently removed and installed, i.e., without interrupting location, placement, or accessibility of any remaining battery trays 112 with the battery dispenser 100, which would not be the case if the face panel 110 required removal or opening or if any other manipulation or movement of other portions of the battery dispenser 100 was required. Hence, the battery dispenser 100 can be operated without all of the battery trays 112 being present. In some embodiments the battery trays 112 are configured to be disposable/recyclable after use, accordingly a new pre-loaded battery tray 112 can be inserted into the empty tray channel 122.

Figure 2A:
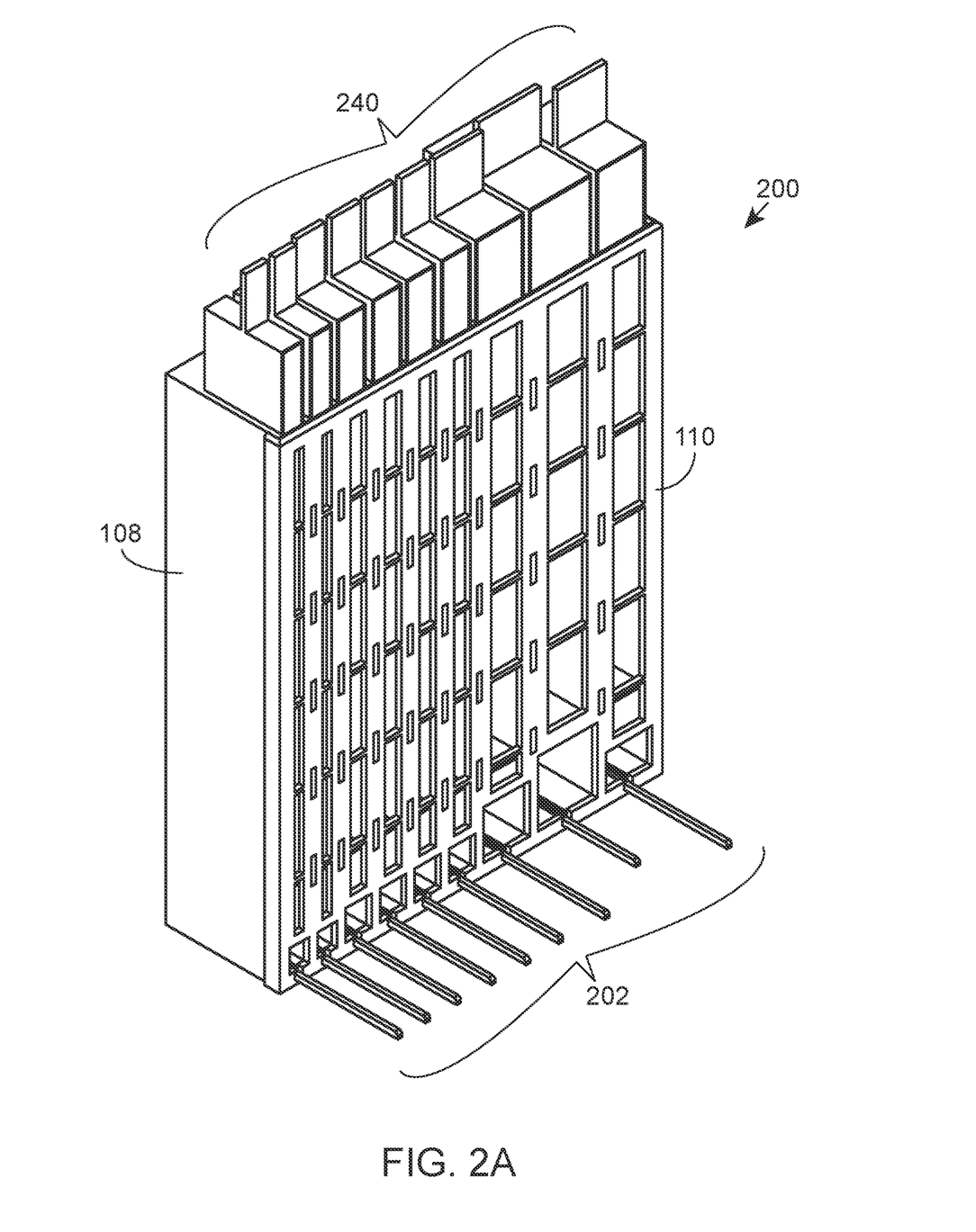
FIG. 2A depicts a perspective view of another apparatus for storing and dispensing batteries, according to some embodiments.

FIG. 2A shows another battery dispenser 200, which is an alternative embodiment of the battery dispenser 100 described above. The battery dispenser 200 is substantially identical to the battery dispenser 100, hence only the differences will be discussed for the sake of brevity. Battery dispenser 200 differs in that it includes battery dispensing mechanisms 202 to enable retrieval of batteries from the battery dispenser 200. Each battery tray channel can include one dispensing mechanism 202.

The dispensing mechanisms 202 are operable by liner actuation of a pull tab 204, i.e., by pulling and pushing the pull tabs out of and into the battery dispenser 200. Pulling a pull tab 204 from first position, in which the pull tab 204 withdrawn into the batter dispenser 200, to a second position causes a lower-most battery to at least partially eject from the battery dispenser 200 and enable its physical retrieval. Ejection is caused by an element of the associated dispensing mechanism 202 moving the battery due to movement of the pull tab. After the ejected battery is removed from the battery dispenser, the pull tab 204 can be pushed back into the battery dispenser 200 from the second position back to the first position which resets the associated dispensing mechanism 202 for ejection of the next battery in the stack.

Figure 2B:
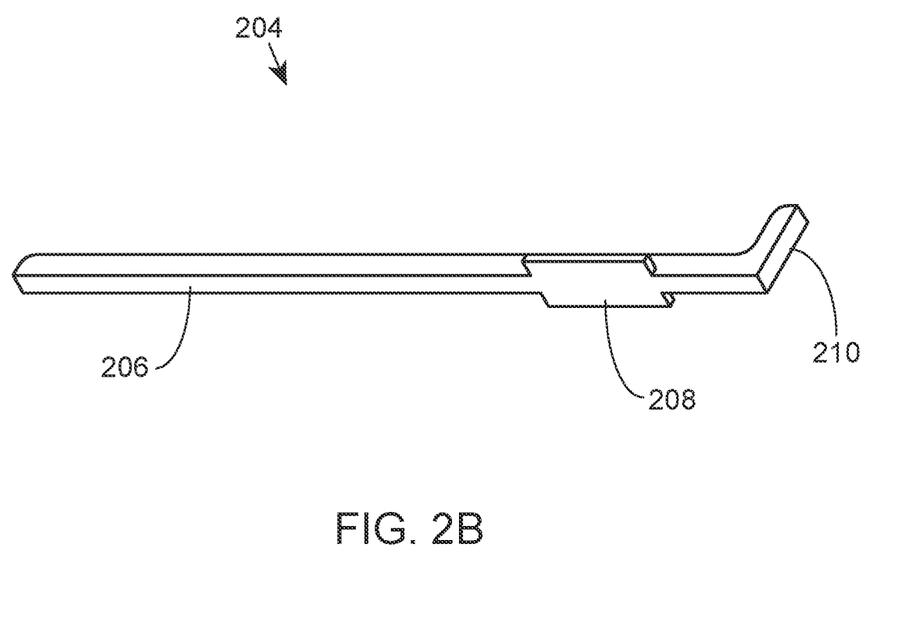
FIGS. 2B-2E depict perspective views of various aspects of the apparatus of FIG. 2A.
Figure 2C:
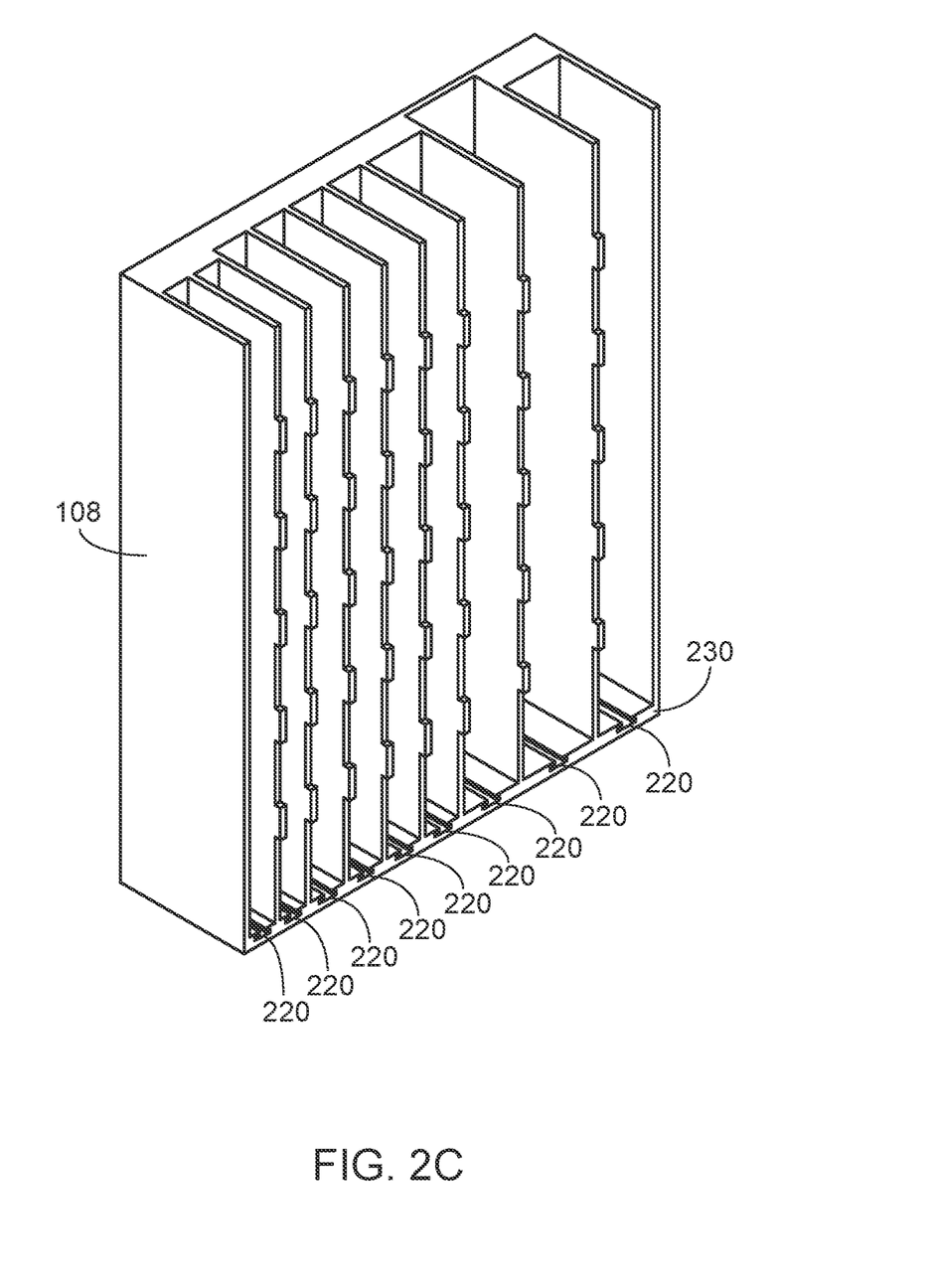
Figure 2D:
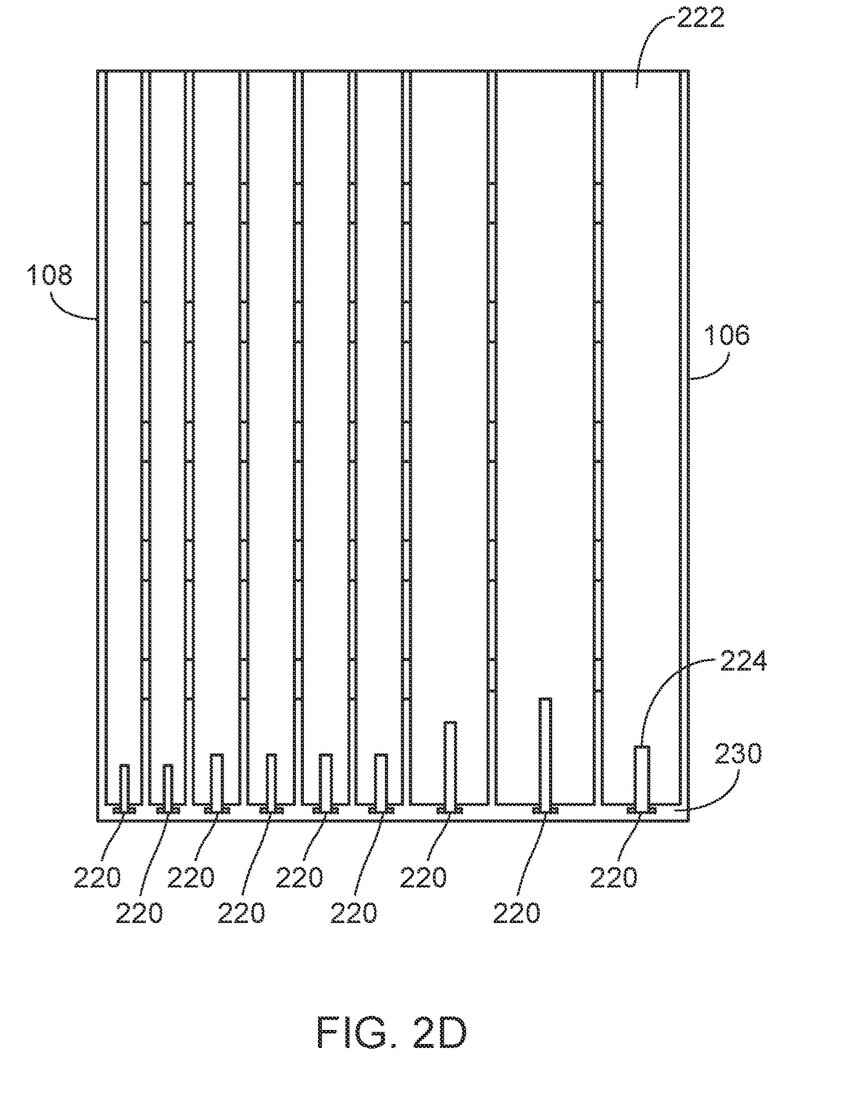

FIG. 2B shows a pull tab 204 removed from the battery dispenser 200 to allow for better understanding of the dispensing mechanisms 202. The pull tab 204 includes an elongated body having a pulling portion 206, a travel guide 208, and a battery ejector 210. The dispensing mechanisms 202 also include housings for the pull tabs 204, which here are depicted as guide tracks 220 of an alternative bottom panel 230, as illustrated in FIGS. 2C and 2D.

The pulling portion 206 and the travel guide 208 slide within the guide tracks 220. The guide tracks 220 can be T-shaped in cross-section (i.e., transverse to the travel direction) to prevent the pull tab 204 from lifting out, as each travel guide 208 is captured within the widest portion of a guide track 220. In some embodiments, the pull tab 204 is spring loaded to bias the pull tab 204 towards the first position, in which the pull tab withdrawn into the battery dispenser. As shown at FIG. 2D, an alternative wall panel 222 can include recessed portions 224 for housing the battery ejectors 210 while in the first position.

Figure 2E:
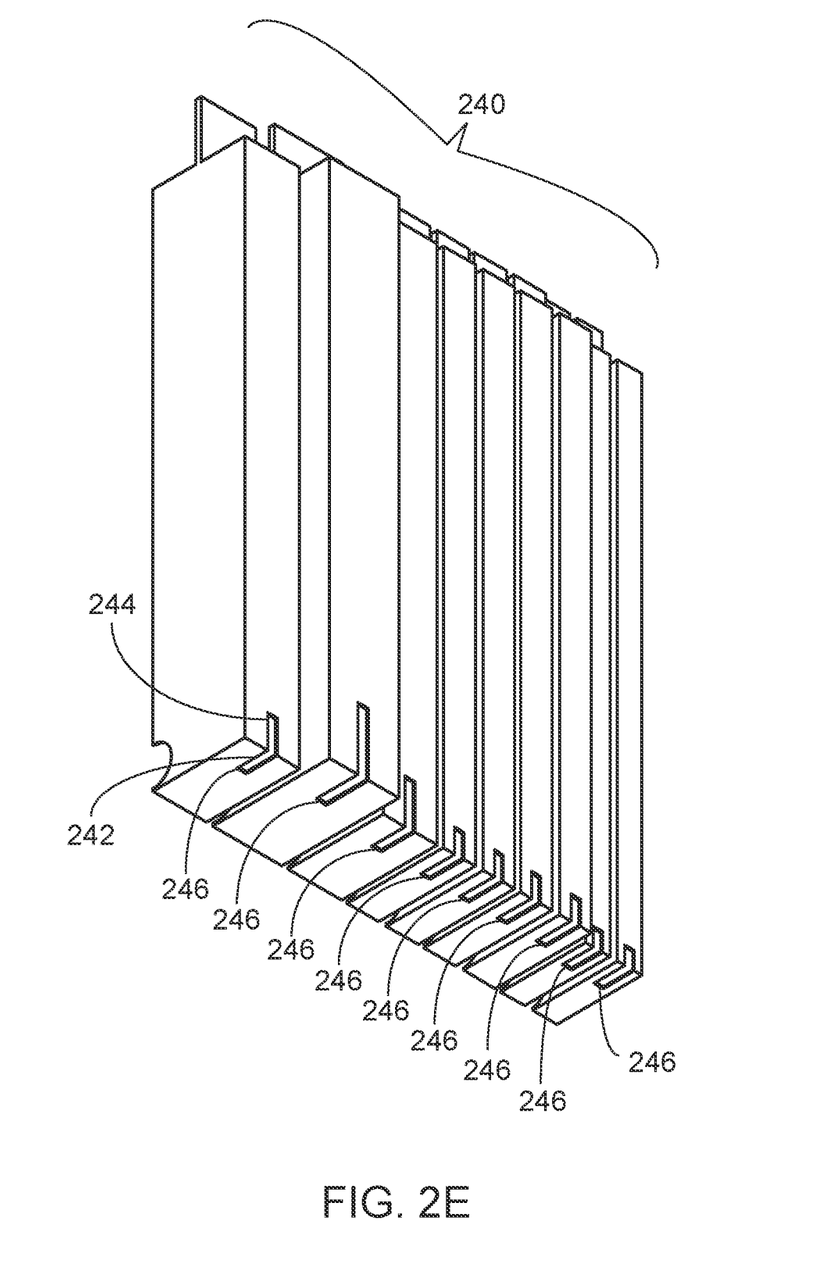

The battery ejectors 210 are configured to extend past the top surface of the bottom panel 230 to cooperate with alternative battery trays 240, as shown at FIG. 2E. Each of the battery trays 240 includes an ejection track 242 that is aligned with a corresponding guide track 220. In the first position, each battery ejector 210 is held within a track cave 244, or past within a recessed portion 224 of the wall panel 222, so as to not significantly interfere with the bottom-most battery of an associated battery tray 240. Each ejection track 242 includes a travel stop 246 that prevents the battery ejector 210 from moving past. When the battery ejector 210 abuts the travel stop, the pull tab 204 is in the second position.

When a pull tab 204 is pulled from the first position to the second position, the associated battery ejector 210 will drag a battery, which is in the lower-most position of a battery stack, out of the battery dispenser 200 to at least partially eject the battery. The ejected battery can then be retrieved by hand. The batteries in the stack that were above the ejected battery will then rest on the battery ejector 210 while in the second position. The pull tab 204 can then be pushed back into the first position such that the battery ejector 210 is held within or past the track cave 244, which causes the battery stack to fully slide down the battery tray. A second battery that was above the ejected battery is then placed into position for ejection by a subsequent operation of the pull tab 204.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which can be readily separated from or combined with the features of any of the other several embodiments without departing from the scope or spirit of the present invention. Any recited method can be carried out in the order of events recited or in any other order that is logically possible.

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations; or operations in an order. Accordingly, the scope and spirit of the invention should be judged in terms of the claims, which follow as well as the legal equivalents thereof.

What is claimed is:

1. A battery dispenser comprising:
a wall panel;
a bottom panel affixed to the wall panel;
a first side panel and second side panel, each being affixed to the wall panel and the bottom panel;
a face panel affixed to at least the first and second side panels;
a plurality of interior dividing features between the wall panel and the face panel, the plurality of interior dividing features defining a plurality of battery tray channels configured to receive a plurality of battery trays;
wherein each battery tray of the plurality of battery trays is configured to hold a plurality of batteries, each battery tray being independently removeable from one of the battery tray channels of the plurality of battery tray channels, wherein a battery tray of the plurality of battery trays is configured to hold the respective plurality of batteries such that the longest central axis of each of the respective plurality of batteries is perpendicular to a back planar surface of the wall panel; and
a plurality of battery ejection mechanisms housed at the bottom panel, wherein the battery tray of the plurality of battery trays is configured to cooperate with a battery ejection mechanism of the plurality of battery ejection mechanisms to eject batteries from the battery tray in a direction from the wall panel towards the face panel, wherein the battery tray ejection mechanism comprises a pull tab configured to at least partially eject a lower-most battery stacked in the battery tray,
wherein the pull tab comprises an elongated body extending from outside of the face panel toward the wall panel and configured to contact the lower-most battery at a first end of the longest central axis proximal to the wall panel and eject a second end of the longest central axis distal to the wall panel of the lower-most battery, the elongated body being moveable within a track at the bottom panel between a first position and a second position, wherein at the first position the elongated body is positioned such that the lower-most battery is fully contained within the battery tray, and wherein at the second position the elongated body is limited in travel by a stop of the battery tray such that only a portion of the lower-most battery comprising the second end of the longest central axis distal to the wall panel of the lower-most battery is ejected from the battery tray.

2. The battery dispenser of claim 1, wherein the face panel, first and second side panels, and wall panel at least partially define a battery tray loading opening at an upper portion of the battery dispenser, each battery tray loading opening of the plurality of battery tray loading openings corresponding to one of the battery tray channels of the plurality of battery tray channels.

3. The battery dispenser of claim 2, wherein the bottom panel, first and second side panels, and wall panel at least partially define a plurality of battery tray ejection openings at a bottom portion of the battery dispenser, each battery tray ejection opening of the plurality of battery tray ejection openings corresponding to one of the battery tray channels of the plurality of battery tray channels.

4. The battery dispenser of claim 3, wherein each battery tray of the plurality of battery trays is configured to be slideably insertable into and removable out of one of the battery tray loading openings of the plurality of battery tray loading openings without disturbing any remaining battery trays of the plurality of battery trays housed within the plurality of battery tray channels.

5. The battery dispenser of claim 1, wherein the plurality of interior dividing features comprise a plurality of interior panels.

6. The battery dispenser of claim 5, wherein the plurality of interior panels are affixed to the wall panel and the face panel.

7. The battery dispenser of claim 1, wherein the pull tab is configured to contact the lower-most battery at a first end of the longest central axis proximal to eject the lower-most battery by sliding the lower-most battery along a bottom surface of the battery tray.

8. The battery dispenser of claim 1, further comprising the plurality of battery trays.

9. The battery dispenser of claim 8, wherein the face panel, first and second side panels, and wall panel at least partially define a battery tray loading opening at an upper portion of the battery dispenser, each battery tray loading opening of the plurality of battery tray loading openings corresponding to one of the battery tray channels of the plurality of battery tray channels.

10. The battery dispenser of claim 9, wherein the bottom panel, first and second side panels, and wall panel at least partially define a plurality of battery tray ejection openings at a bottom portion of the battery dispenser, each battery tray ejection opening of the plurality of battery tray ejection openings corresponding to one of the battery tray channels of the plurality of battery tray channels.

11. The battery dispenser of claim 10, wherein each battery tray of the plurality of battery trays is configured to be slideably insertable into and removable out of one of the battery tray loading openings of the plurality of battery tray loading openings without disturbing any remaining battery trays of the plurality of battery trays housed within the plurality of battery tray channels.

12. The battery dispenser of claim 8, wherein the plurality of interior dividing features comprise a plurality of interior panels.

13. The battery dispenser of claim 12, wherein the plurality of interior panels are affixed to the wall panel and the face panel.

14. The battery dispenser of claim 8, wherein the pull tab is configured to contact the lower-most battery at a first end of the longest central axis proximal to eject the lower-most battery by sliding the lower-most battery along a bottom surface of the battery tray.

* * * * *